United States Patent
Kim et al.

(10) Patent No.: US 9,714,171 B2
(45) Date of Patent: Jul. 25, 2017

(54) GRAPHENE-NANO PARTICLE COMPOSITE HAVING NANO PARTICLES CRYSTALLIZED THEREIN AT A HIGH DENSITY

(71) Applicant: CHEORWON PLASMA RESEARCH INSTITUTE, Cheorwon-gun, Gangwon-do (KR)

(72) Inventors: Steven Kim, Gangwon-do (KR); Byung-Koo Son, Namyangju-si (KR); Myoung-Sun Shin, Namyangju-si (KR); Sung-Hun Ryu, Yongsan-gu (KR); Sun-Yong Choi, Namyangju-si (KR); Kyu-Hang Lee, Namyangju-si (KR)

(73) Assignee: CHEORWON PLASMA RESEARCH INSTITUTE, Cheorwon-Gun (KR)

( * ) Notice: Subject to any disclaimer, the term of this patent is extended or adjusted under 35 U.S.C. 154(b) by 246 days.

(21) Appl. No.: 14/141,938

(22) Filed: Dec. 27, 2013

(65) Prior Publication Data
US 2014/0219906 A1 Aug. 7, 2014

(30) Foreign Application Priority Data
Feb. 5, 2013 (KR) .................................. 201312743

(51) Int. Cl.
*H01B 1/04* (2006.01)
*B82Y 30/00* (2011.01)
*C01B 31/04* (2006.01)

(52) U.S. Cl.
CPC ...... *C01B 31/0484* (2013.01); *C01B 2204/32* (2013.01)

(58) Field of Classification Search
CPC ....... H01B 1/04; C01B 31/04; C01B 2204/32; C01B 31/0484; B82Y 30/00
(Continued)

(56) References Cited

U.S. PATENT DOCUMENTS

| 2011/0186789 A1* | 8/2011 | Samulski ............... B82Y 30/00 252/514 |
| 2011/0256014 A1* | 10/2011 | Hong .................. C22C 1/0425 419/11 |

(Continued)

FOREIGN PATENT DOCUMENTS

| CN | 101550003 A | * 10/2009 | ............. C04B 35/52 |
| DE | WO 2011141486 A1 | * 11/2011 | ............. H01M 4/525 |

OTHER PUBLICATIONS

Bai ("Graphene-inorganic nanocomposites." RSC Advances, 2, pp. 64-98, pub 2012).*
U.S. Appl. No. 14/140,297, Cheorwon Plasma Research Institute.

*Primary Examiner* — Tri V Nguyen
(74) *Attorney, Agent, or Firm* — Polsinelli PC

(57) ABSTRACT

The present invention relates to a graphene-nanoparticle composite having a structure in which nanoparticles are crystallized in a carbon-based material, for example, graphene, at a high density, and, more particularly, to a graphene-nanoparticle composite capable of remarkably improving physical properties such as contact characteristics between basal planes of graphene and conductivity, wherein nanoparticles are included as a large amount of 30% by weight or more, based on 100% by weight of graphene, and crystallized nanoparticles have an average particle diameter of 200 nm or more, and a method of preparing the same.

9 Claims, 7 Drawing Sheets

CHEMICAL MECHANISM IN WHICH SN IS SYNTHESIZED INTO GRAPHENE

(58) Field of Classification Search
USPC ...... 252/500–519.1; 257/13; 429/231.8–439;
423/445 R, 448; 977/734, 755, 777, 827
See application file for complete search history.

(56) References Cited

U.S. PATENT DOCUMENTS

| | | | |
|---|---|---|---|
| 2011/0284805 A1* | 11/2011 | Samulski | B82Y 30/00 252/503 |
| 2012/0208088 A1* | 8/2012 | Xie | B01D 53/02 429/231.8 |
| 2012/0214068 A1* | 8/2012 | Dai | H01G 11/36 429/224 |
| 2013/0211106 A1* | 8/2013 | El-Shall | B01J 19/126 549/445 |
| 2013/0224452 A1* | 8/2013 | Ramaprabhu | H01J 1/304 428/209 |
| 2013/0285012 A1* | 10/2013 | Lee | H01L 33/04 257/13 |

* cited by examiner

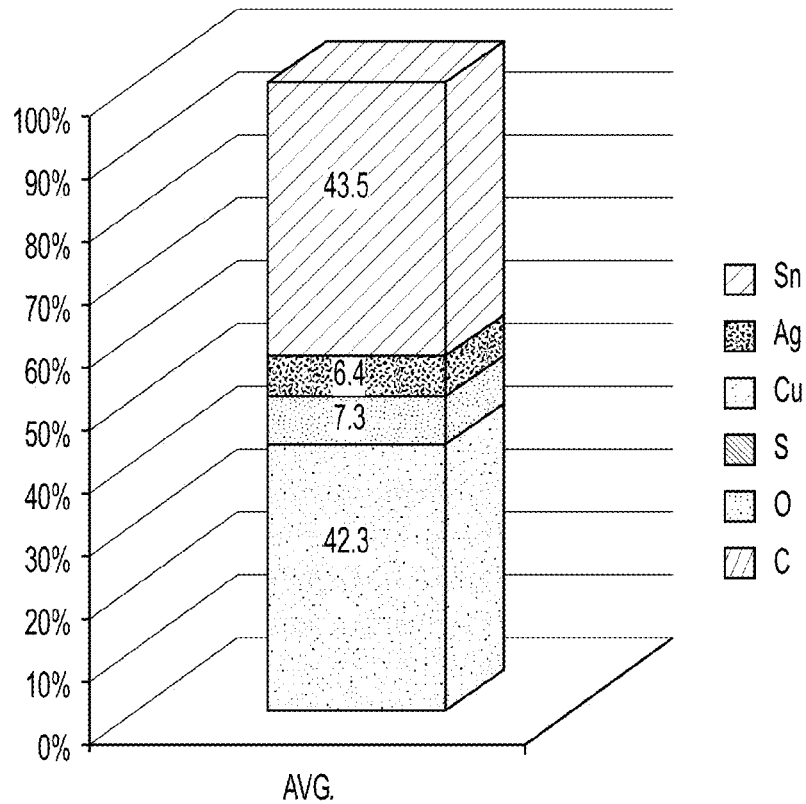
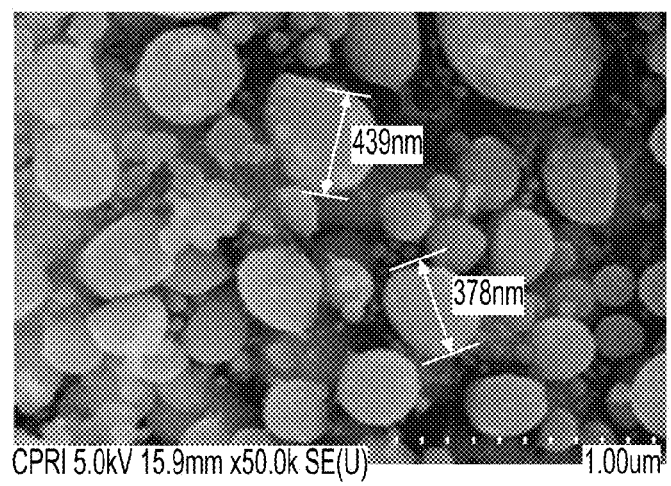
FIG. 1

CHEMICAL MECHANISM IN WHICH SN IS SYNTHESIZED INTO GRAPHENE

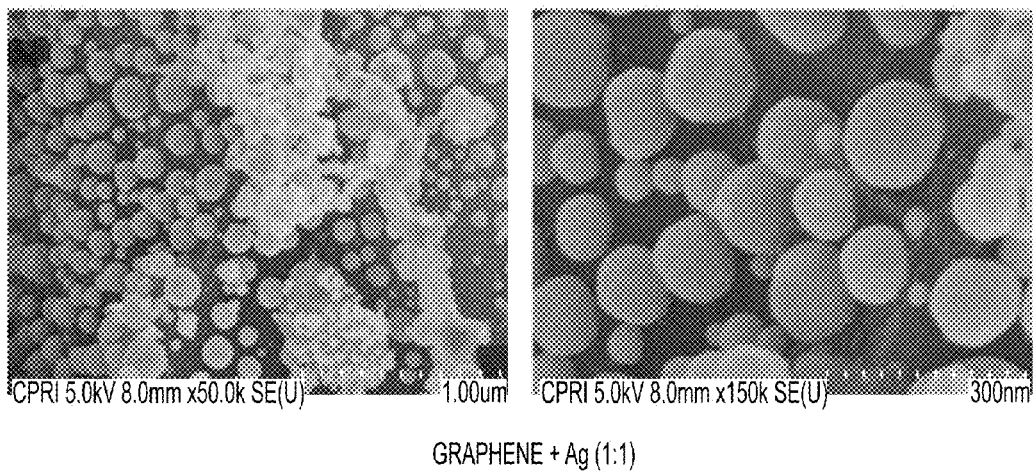
GRAPHENE + Ag (1:1)
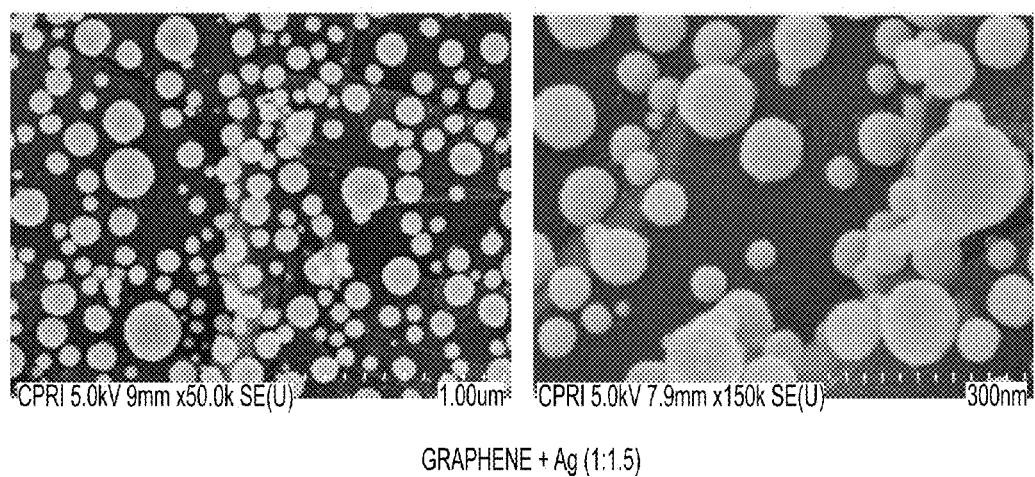
GRAPHENE + Ag (1:1.5)
*FIG. 4*

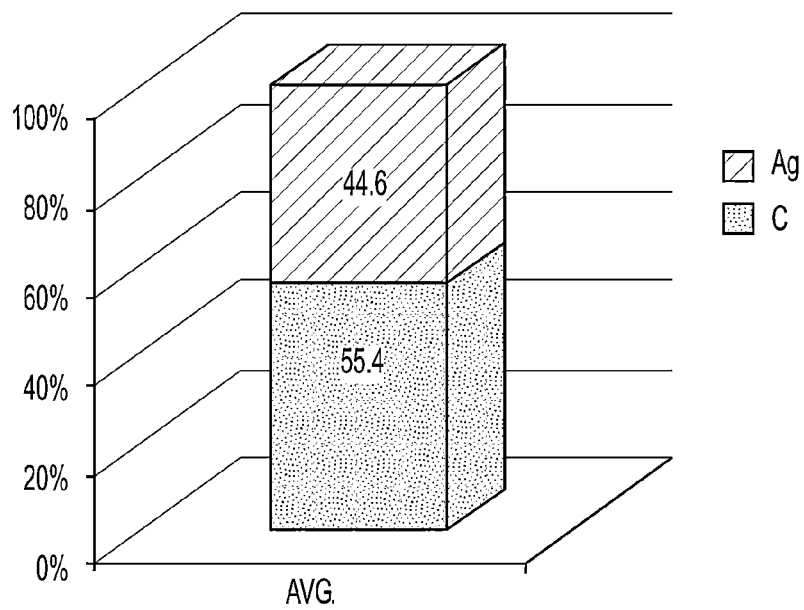
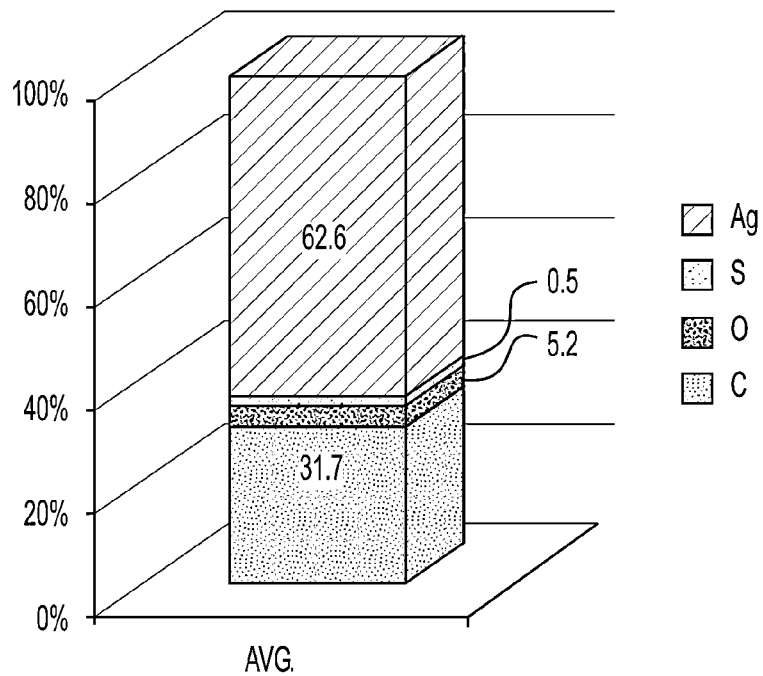
FIG. 5

GRAPHENE-NANO PARTICLE COMPOSITE HAVING NANO PARTICLES CRYSTALLIZED THEREIN AT A HIGH DENSITY

CROSS-REFERENCE TO RELATED APPLICATION

This application claims under 35 U.S.C. §119(a) the benefit of Korean Patent Application No. 2013-12743 filed on Feb. 5, 2013, the entire contents of which are incorporated herein by reference.

BACKGROUND

Technical Field

The present disclosure relates to a graphene-nanoparticle composite having a structure in which nanoparticles are crystallized at a high density in a carbon-based material, for example, graphene, and, more particularly, to a graphene-nanoparticle composite capable of remarkably improving physical properties such as contact characteristics between basal planes of graphene and conductivity, wherein nanoparticles are included as a large amount of 30% by weight or more, based on the total amount of the composite, and crystallized nanoparticles have an average particle diameter of 200 nm or more, and a method of preparing the same.

Background Art

In recent years, interest in nanotechnology has been increasing with the rapid development of electronics, info-communication and biotechnology, and nanopowder has been increasingly expected to be applied to various applications such as high-strength machinery parts, catalytics, medicine and biotechnology, as well as electrics and electronics, since nanopowder exhibits new peculiar physical properties which have not been exhibited by conventional powder, as the conventional powder is ground into highly fine particles.

Graphene represents a carbon structure with a 2D nanosheet single layer in which sp2 carbon atoms are used to form a hexagonal honeycomb lattice. Since the year 2004, when a group of Geim researchers in England separated graphene from graphite using a mechanical peel-off method, various reports regarding graphene have continued to be issued. Graphene is a compound which has come into the spotlight as an epoch-making new material due to the very high specific surface area (a theoretical value of 2,600 m2/g) compared with the volume, excellent electric conductivity (a reference value of 8×105 S/cm in an aspect of quantum mechanics), and physical and chemical stability.

In particular, graphene may function as a template on which a nano-sized transition metal oxide can be deposited due to a high specific surface area, excellent electric conductivity and physicochemical stability, and thus has unlimited applicability to energy storage materials for various devices (lithium ion secondary batteries, hydrogen storage fuel cells, and supercapacitors), gas sensors, micro-parts for biomedical engineering, highly functional complexes, and the like upon formation of nanocomplexes with transition metals.

However, graphene is not easily peeled off in a solution due to the presence of van der Waals interaction between basal planes of graphene caused by a sp2 carbon bond formed on a surface of the graphene, and is present in the form of thick multilayer graphene other than single-layer graphene. Also, graphene has a restacking property to be restacked even when graphene is peeled off. Therefore, graphene has problems in that it is impossible to make use of a high specific surface area of the single-layer graphene, and it is difficult to form a uniform composite structure. This serves as a factor inhibiting its use.

Also, graphene has characteristics such as high thermal and electric conductivity in a horizontal direction and low thermal and electric conductivity in a vertical direction between graphene layers, as viewed from a planar structure of graphene. Therefore, when graphene is applied to applied thermal or electric devices, an increase in thermal or electric contact resistance is caused according to a physical contact shape of a connection point between graphene and graphene, thereby inhibiting use of its innate high characteristics.

Accordingly, to solve the problem regarding the contact resistance between graphene and graphene, there is an increasing attempt conducted to enhance contact resistance by chemically depositing or attaching a nano-sized metallic material on/to a surface of graphene.

However, only the edge and defective parts of graphene are generally deposited when nanoparticles attempt to be deposited on graphene. In particular, there has been an attempt conducted to deposit nanoparticles on a surface of graphene using a wet process known in the related art. This wet process does not have an excellent effect of improving mechanical and electric characteristics of graphene since the nanoparticles are deposited on less than 10% of the surface of graphene. Sundaram et al. reported that palladium (Pd) nanoparticles are electrodeposited onto graphene, but that palladium (Pd) nanoparticles are deposited onto only the edge of graphene (Adv. Mater. 2008, 20, 3050). Also, a chemical wet process method is used to forcibly form a defective part, but has problems in that it is difficult to optionally form a defective part at a certain position or several positions, and the original structure, that is, a hexagonal honeycomb lattice with a single bond, of graphene may be damaged when defects are formed at too many positions, thereby inhibiting electrochemical or thermal characteristics.

Thus, there is an urgent demand for the development of a composite in which a large amount of a nanomaterial is deposited so as to improve reactivity in a basal plane of graphene, and a method of preparing the same.

Accordingly, the present inventors have found that a graphene-nanoparticle composite, in which nanoparticles crystallized in a surface of graphene are included at a high density, especially, the nanoparticles are included at a content of 30% by weight or more, based on the total weight of the composite, and the crystallized nanoparticles have an average particle diameter of 200 nm or more, can be obtained by fusing a nanomaterial with graphene using a radio-frequency thermal plasma process other than a conventional wet process. Therefore, the present invention is completed based on these facts.

SUMMARY OF THE DISCLOSURE

The present invention has been proposed to solve the above drawbacks and an object of the present invention is to provide a graphene nanoparticle composite having a structure in which nanoparticles are crystallized at a high density in graphene, and a stacked structure thereof.

Another object of the present invention is to provide various uses of a high-density graphene nanoparticle composite.

Still another object of the present invention is to provide a method of preparing the high-density graphene nanoparticle composite.

In order to achieve the above objects, a graphene-nanoparticle composite in which nanoparticles crystallized in a surface of graphene have chemical bonds formed therein at a high density, wherein the nanoparticles are included at a content of 30% by weight or more, preferably 30 to 60% by weight, based on the total weight of the composite, and the crystallized primary nanoparticles have an average particle diameter of 200 nm or more, preferably 200 to 500 nm.

In this case, the nanoparticles may have a surface area accounting for 30 to 70% of the graphene-nanoparticle composite.

The nanoparticles that may be used in the present invention may be selected from the group consisting of an alkali metal, an alkaline earth metal, a lanthanum, an actinium, a transition metal, a post-transition metal, a metalloid, a nonmetallic material, and the like. For example, the nanoparticles may be selected from Ni, Si, Ti, Cr, Mn, Fe, Co, Cu, Sn, In, Pt, Au, Mg, or a combination thereof, preferably Sn or Ag. In particular, the graphene and the nanoparticles may be included at a weight ratio (% by weight) of 1:1 to 1:3.

The graphene-nanoparticle composite according to the present invention exhibits excellent mechanical and electric characteristics since nanoparticles crystallized in a surface of graphene are included in a large amount to form chemical bonds at a high density. In particular, the graphene-nanoparticle composite may be widely used in the field of applications since the graphene-nanoparticle composite has an excellent electric conductivity of 1000 to 3000 S/m, and exhibits heat radiating characteristics, for example, a thermal conductivity of 5 to 30 W/mK.

Also, the present invention provides a stacked structure obtained by stacking the high-density graphene-nanoparticle composite, and use thereof.

In particular, the stacked structure may be effectively used in various electrochemical devices due to the excellent mechanical and electric characteristics. For example, the stacked structure may be applied to electrodes, electric elements, and thermoelectric materials, all of which include the graphene-nanoparticle composite or stacked structure thereof, and may also be used due to the thermal conductivity characteristics as a heat radiating material for extending the life span of display devices, lighting equipment such as LED, and electronic equipment such as computer parts.

Meanwhile, the present invention provides a method of preparing the graphene-nanoparticle composite, which includes:

(a) mixing nanoparticle powder of at least one nanomaterial selected from the group consisting of Ni, Si, Ti, Cr, Mn, Fe, Co, Cu, Sn, In, Pt, Au, Mg and a combination thereof with graphene;

(b) injecting the mixture and a gas;

(c) vaporizing the nanoparticles through RF thermal plasma treatment; and (d) crystallizing the vaporized nanoparticles in a surface of graphene.

In this case, the nanoparticles in operation (a) may be included at a large amount of 20 to 50% by weight, based on the total weight of the composite.

Gases that may be used in operation (b) may be divided into a sheath gas, a central gas, a carrier gas, and the like, depending on functions of the gases. Preferably, the desired functions of the gas may be achieved by adjusting an amount of argon gas injected.

In operation (c), the RF thermal plasma treatment may be performed by supplying an electric power of 10 to 70 kW. In preparation of the high-density graphene-nanoparticle composite according to the present invention, such RF thermal plasma treatment has various advantages.

Also, in operation (d), the vaporized nanomaterial may be crystallized in a surface of graphene by condensing or quenching the nanoparticles through treatment with a quenching gas. In this case, the nanoparticles may be nanocrystallized while growth of the nanoparticles is being suppressed using this method. Also, argon gas may be used as the quenching gas.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein:

FIG. 1 is a diagram illustrating EDX analysis results and FE-SEM imaging results of a graphene-Sn nanoparticle composite (1:2) prepared according to the present invention;

FIG. 4 shows FE-SEM imaging results of the graphene-Ag nanoparticle composite prepared according to the present invention;

FIG. 5 shows EDX analysis results of the graphene-Ag nanoparticle composite prepared according to the present invention;

Figure 2:
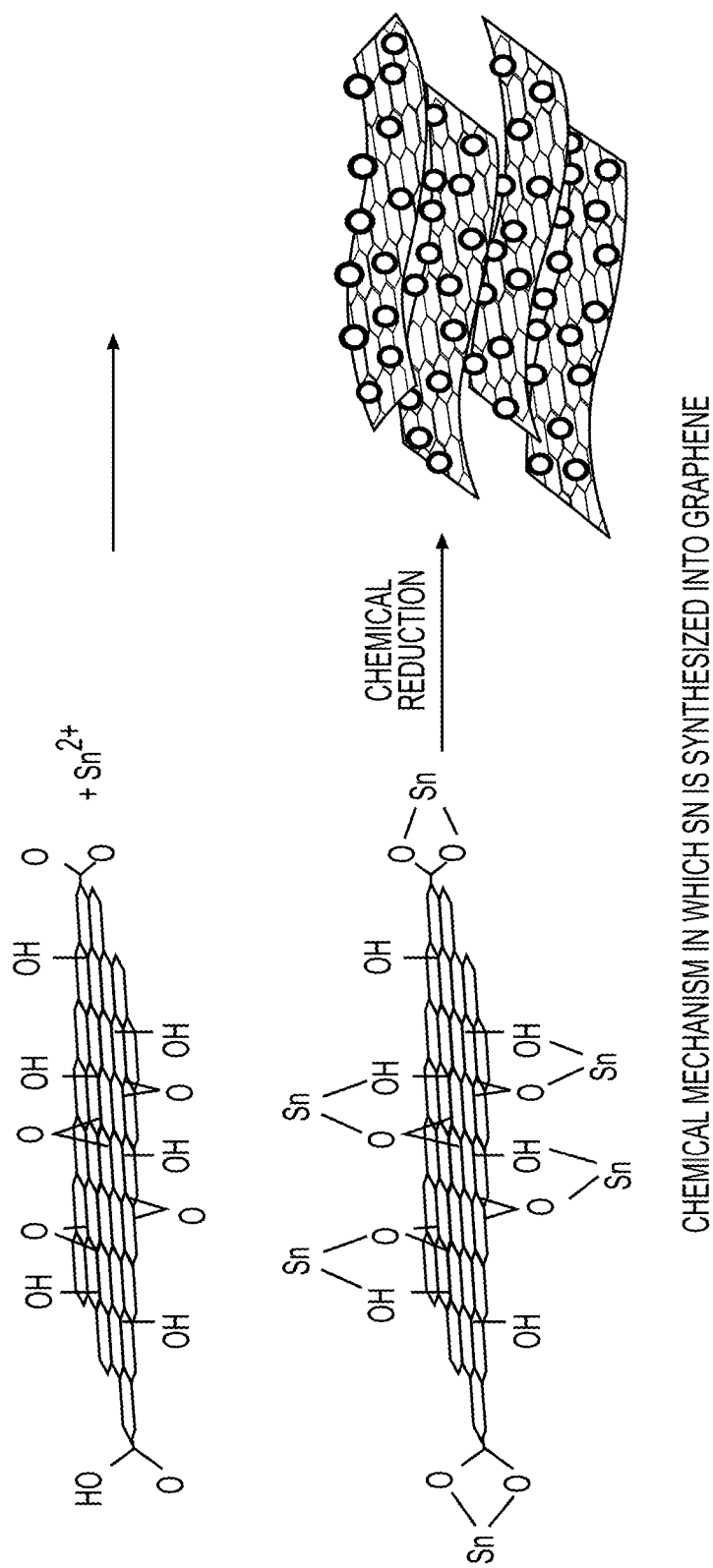
FIG. 2 is a schematic view of a chemical mechanism in which Sn is synthesized into graphene according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below.

Prior to the description, it should be understood that the terminology used in the specification and appended claims should not be construed as limited to general and dictionary meanings, but interpreted based on the meanings and concepts corresponding to technical aspects of the present invention on the basis of the principle that the present inventors are allowed to define the terms appropriately for the best explanation. Therefore, the description proposed herein is just a preferable example for the purpose of illustrations only, not intended to limit the scope of the invention, so it should be understood that other equivalents and modifications could be made thereto without departing from the scope of the invention.

Until now, a decrease in chemical reactivity in a basal plane of graphene has been issued as a great obstacle in connection with applications of graphene. No dangling bond capable of participating in a chemical reaction is present in the entire basal plane of graphene, but defective parts are present in the edge and basal plane of graphene. The presence of such a dangling bond capable of participating in the chemical reaction may cause more degradation of chemical reactivity in the basal plane of graphene, compared with the edge and defective parts of graphene. Therefore, when nanoparticles attempt to deposit onto graphene, the nanoparticles are generally deposited onto the edge and defective parts of graphene. Sundaram et al. also reported that palladium (Pd) nanoparticles are electrodeposited onto graphene, but the palladium (Pd) nanoparticles are deposited onto only the edge of graphene (Adv. Mater. 2008, 20, 3050). Therefore, the problems regarding the chemical reactivity in the basal plane of graphene remain to be solved.

Accordingly, one aspect of the present invention provides a graphene-nanoparticle composite having a structure capable of solving the above problems, for example, enhancing reactivity in the basal plane of graphene, that is, a structure in which nanoparticles are homogeneously crystallized at a high density in graphene that is a carbon-based material, and a method of preparing the same.

In one aspect, the present invention relates to a graphene-nanoparticle composite in which nanoparticles are homogeneously crystallized at a high density in a surface of graphene which is a carbon-based material, especially, nanoparticles are included at a large amount of 30% by weight or more, preferably 30 to 60% by weight.

The term "graphene" generally refers to a single planer sheet of sp2-bound carbon atoms filled densely in a honeycomb crystal lattice. Here, a carbon-carbon bond in graphene has a length of approximately 0.142 nm, and graphene is a basic structural element of some carbon allotropes including graphite, a carbon nanotube, and fullerene. The graphene according to the present invention includes such a single-layer carbon sheet, and has a stacked structure obtained by stacking the single-layer carbon sheet. In addition, the graphene according to the present invention includes a material presented as a portion of an element which may include a graphite layer, a carbon layer, and a carbon sheet. That is, the term "graphene" is used as an abbreviated word representing graphene, a graphene derivative, functionalized graphene, or a combination thereof.

Kinds of graphene which may be used in the present invention may be obtained using various methods known in the related art. For example, graphene may be produced through chemical reduction of a graphene oxide, as disclosed in Gomez-Navarro, C.; Weitz, R. T.; Bittner, A. M.; Scolari, M.; Mews, A.; Burghard, M.; Kern, K., Electronic Transport Properties of Individual Chemically Reduced Graphene Oxide Sheets, and Nano Lett. 2007, 7, 3499-3503. Si, Y.; Samulski, E. T., Synthesis of Water Soluble Graphene, Nano Lett. 2008, 8, 1679-1682, but the present invention is not limited thereto.

The graphene-nanoparticle composite of the present invention is characterized in that the nanoparticles are crystallized at a "high density" since the nanoparticles are included in a surface of graphene at an amount of 30% by weight or more, preferably 30 to 60 wt %, based on the total amount of the composite.

In this case, the nanoparticles may be particles of a metal or nonmetallic material present in a solid phase at room temperature. For example, the metal or nonmetallic material may be selected from the group consisting of an alkali metal, an alkaline earth metal, a lanthanum, an actinium, a transition metal, a post-transition metal, a metalloid, and a nonmetallic material in the periodic table of elements. Preferably, the metal material is an alkali metal, an alkaline earth metal, a lanthanum, an actinium, or a transition metal.

By way of specific example, the nanoparticles may be particles of at least one selected from the group consisting of Ni, Si, Ti, Cr, Mn, Fe, Co, Cu, Sn, In, Pt, Au, Mg, or a combination thereof. According to one exemplary embodiment of the present invention, Sn and Ag were used. In particular, the graphene and the nanoparticles may be included at a weight ratio (% by weight) of 1:1 to 1:3.

In the composite of the present invention, the nanoparticles having chemical bonds formed on a surface of graphene are crystallized at a high density, which is approximately 100 times higher than a conventional graphene-nanoparticle composite.

In particular, the crystallized nanoparticles have "chemical bonds" formed at a high density in a surface of graphene. That is, the crystals of the nanoparticles according to the present invention have a homogeneous crystal shape such as a spherical and hemispherical shape formed on a surface of graphene, compared with the conventional composite having an inhomogeneous shape. Also, the nanoparticles are crystallized at a high density suitable for determining whether bonds as observed in XRD are chemical bonds.

In the composite of the present invention, the nanoparticles are also characterized in that the nanoparticles have a surface area accounting for 30 to 70% of the graphene-nanoparticle composite.

In addition, in the composite of the present invention, the crystals formed on a surface of graphene by the nanoparticles are crystals of primary particles which are crystallized by growth through radio-frequency thermal plasma treatment after undergoing a selective vaporization process. Therefore, the composite of the present invention is characteristic of large-size particles. In the composite of the present invention, the crystals formed by the nanoparticles have an average particle size of 200 nm or more, preferably 200 to 500 nm, and are realized with contact characteristics between graphene composites. Therefore, it is possible to reduce contact resistance, thereby improving thermal or electric characteristics. In particular, the nanoparticles have physical properties, for example, have an increasing surface area of a surface of graphene and a very high crystal size of the nanoparticles bound to the surface of graphene, unlike nano-graphene according to the prior art. According to one exemplary embodiment of the present invention, it is revealed that tin nanoparticles in a surface of graphene have formed crystals having a size of 400 nm or more.

Owing to these advantageous characteristics, the graphene-nanoparticles composite according to the present invention shows excellent conductivity. That is, the graphene-nanoparticles composite has an electric conductivity of approximately 1000 to 5000 S/m, preferably 1000 to 3000 S/m, and a thermal conductivity of approximately 5 to 30 W/mK.

On the other hand, the graphene-nanoparticle composite known in the prior art has a structure in which nanoparticles are inhomogeneously present at a low density in a surface of graphene to the extent that it is difficult to determine whether or not there are chemical bonds formed in the nanoparticles. Therefore, the conventional graphene-nanoparticle composite does not have excellent mechanical and electric characteristics since the nanoparticles are not sufficiently distributed on graphene, that is, the nanoparticles account for less than 10% of a surface area of the graphene. However, the graphene-nanoparticle composite according to the present invention may be useful in solving the above problems since the nanoparticle crystals are homogeneously bound onto a surface of graphene at a high density.

Also, another aspect of the present invention relates to a stacked structure of the graphene-nanoparticle composite in which the nanoparticles are crystallized at a high density in a surface of graphene.

The stacked structure according to the present invention includes a series of regular layers formed therein. Here, each of the regular layers includes high-density nanoparticle crystals bound to at least one graphene. Persons having ordinary skill in the related art will recognize that some of the high-density nanoparticle crystals in each of consecutive layers are bound to graphene moieties of adjacent layers. For example, although not intended to be defined, some of the high-density nanoparticle crystals in one layer may be bound to some of the nanoparticles in the consecutive layers, or the nanoparticles may be used to form a series of layers. When two or more layers in such a structure include nanoparticles bound to at least one graphene layer, it should be understood that the description set forth herein falls within the scope of the present invention disclosed in this specification.

The number of layers in the graphene sheet may be adjusted according to a purpose. In this case, contact characteristics and electric conductivity are determined, depending on whether nanoparticle crystals presented in a surface of graphene are homogeneously distributed in a large amount between layers in a stacked structure in which the number of layers in the graphene sheet is in a range of 1 to several tens.

Accordingly, when a stacked structure is formed by the high-density graphene-nanoparticle composite according to the present invention, the stacked structure has interlayer contact characteristics as nanoparticle crystals having a large diameter are present at a high density, thereby exhibiting very excellent characteristics such as electric conductivity.

In the prior art, the graphene-nanoparticle composite does not exhibit sufficient interlayer contact characteristics and its conductivity characteristics since only the nanoparticles of less than 10% by weight are included in the graphene-nanoparticle composite. However, the stacked structure formed by the high-density graphene-nanoparticles composite according to the present invention may be useful in solving the above problems.

Another aspect of the present invention relates to a graphene-nanoparticle composite in which nanoparticles are crystallized at a high density in a surface of graphene, and various uses of a stacked structure thereof.

Graphene is expected to be used in the field of various applications such as next-generation electronic devices, solar cells, fuel cells and the like since the graphene shows peculiar characteristics such as very high strength and very high electrical conductivity. Owing to the peculiar electric and mechanical characteristics of graphene, for example, an electrochemical energy storage device may be applied to electric automobiles and renewable energy systems for intermittent wind and solar power.

The "electrochemical device" includes an energy storage device, an energy conversion device, a sensor, and other devices for converting electric energy into chemical energy or chemical energy into electric energy. The term "energy storage device" used in this specification includes batteries and supercapacitors. For example, there is provided an electrode including the graphene-nanoparticle composite or stacked structure thereof, an electric element including the graphene-nanoparticle composite or stacked structure thereof, and a thermoelectric material including the graphene-nanoparticle composite or stacked structure thereof.

Also, since the graphene-nanoparticle composite has heat radiating characteristics, for example, a thermal conductivity of 5 to 30 W/mK, the thermal contact resistance caused by use of pure graphene alone may be lowered. As a result, when the graphene-nanoparticle composite is used for heat radiating elements/parts, the graphene-nanoparticle composite may be effectively used as a heat radiating material for extending the life span of display devices, lighting equipment such as LED, and electronic equipment such as computer parts, all of which are expected to be damaged or functionally degraded due to the heat radiating characteristics.

As described above, the present invention can be effectively used in various electrochemical devices and apparatuses including the graphene-nanoparticle composite having excellent characteristics, or the stacked structure thereof.

The graphene-nanoparticle composite according to the present invention in which nanoparticles are homogeneously crystallized at a high density in a surface of graphene, especially, the nanoparticles are included with a large amount of 30 to 60% by weight, based on the total amount of graphene may be prepared using atmospheric pressure radio-frequency thermal plasma. Therefore, still another aspect of the present invention relates to a method of preparing a high-density graphene-nanoparticle composite.

A conventional gas-phase synthesis technique of preparing a metallic nanopowder includes inert gas condensation (IGC), chemical vapor condensation (CVC), metal-salt spray drying, and the like. Among these, the IGC process may be used to prepare a high-purity, ultra-fine metal nanopowder, but has limitations on industrial applications due to demand for high energy consumption and low production rate. Also, the CVC process is somewhat improved in aspects of energy and a production rate, compared with the IGC process, but is disadvantageous in an economical aspect due to the very high cost of a precursor that is a source material. Also, the metal-salt spray drying process is economically advantageous since inexpensive salt is used as a source, but is disadvantageous in an environmental aspect since it is difficult to avoid contamination and condensation of powder in a drying process, and toxic by-products may be produced.

A technique of preparing a nanopowder using radio-frequency thermal plasma, which can solve the problems regarding such a conventional method of preparing a nanopowder and produce the uniform nanopowder more economically, has been developed thus far.

The method according to the present invention is characterized in that it uses such atmospheric pressure radio-frequency thermal plasma. One exemplary embodiment of the present invention may provide a method of preparing a high-density graphene-nanoparticle composite, which includes:

(a) mixing nanoparticle powder with graphene;

(b) injecting the mixture and a gas;

(c) vaporizing nanoparticles through RF thermal plasma treatment; and (d) crystallizing the vaporized nanoparticles in a surface of graphene.

In operation (a), the nanomaterial used is a metal or nonmetallic material presented in a solid phase at room temperature. In this case, at least one selected from the group consisting of an alkali metal, an alkaline earth metal, a lanthanum, an actinium, a transition metal, a post-transition metal, a metalloid, and a nonmetallic material in the periodic table of elements may be used as the nanomaterial. Preferably, the nanomaterial that may be used herein includes Ni, Si, Ti, Cr, Mn, Fe, Co, Cu, Sn, In, Pt, Au, Mg, or a combination thereof, etc.

A mixed powder is prepared by mixing the nanomaterial with graphene. In this case, a mixing ratio of the nanomaterial and graphene may be optionally set according to a purpose of use. In the present invention, however, the nanomaterial may be mixed at a content of 20 to 50% by weight, based on the total weight of the composite since the nanomaterial is present at a high density in a surface of graphene.

Such a mixed powder may be mixed using a widely used mixing machine or as many quantitative source feeding machines as the number of sources used may be used herein.

Gases used in operation (b) may be divided into a sheath gas, a central gas, a carrier gas, and the like, depending on functions of the gases. An inert gas such as argon, hydrogen, nitrogen or a mixed gas thereof may be used as such a gas. Preferably, argon gas is used herein.

A sheath gas is injected to prevent vaporized particles from being attached to an inner surface of a wall and also protect a surface of the wall from ultra-high temperature plasma as well. In this case, 30 to 80 lpm (liters per minute) of argon gas may be used as the sheath gas. The central gas is injected to produce high-temperature thermal plasma. In this case, 30 to 70 lpm of argon gas may be used as the central gas. Also, the carrier gas serves to feed mixed powder into a plasma reactor. In this case, 5 to 15 lpm of argon gas may be used as the carrier gas.

In operation (c), the nanomaterial included in the mixed powder is vaporized using radio-frequency thermal plasma. The thermal plasma refers to an ionized gas composed of electrons, ions, atoms and molecules, all of which are produced in a plasma torch using direct current (DC) arc or radio-frequency inductively coupled discharge. Here, the thermal plasma is a high-speed jet gas having high activities and an ultra-high temperature spanning from several thousands to several tens of thousands K. Therefore, to produce the high-temperature plasma smoothly, an electric power of 10 to 70 kW is applied to a power supply device of the plasma device, an arc is formed by electric energy, and ultra-high temperature plasma having a temperature of approximately 10,000 K is produced by the argon gas used as a thermal plasma producing gas. The ultra-high temperature thermal plasma, which is produced using the argon gas as the producing gas while maintaining a constant electric power of 10 to 70 kW as described above, may be produced at a higher temperature than the thermal plasma produced using thermal treatment or combustion.

In operation (d), a quenching gas is used to crystallize the vaporized nanomaterial in a surface of graphene. That is, the nanoparticles are nanocrystallized while the nanoparticles are being condensed or quenched by the quenching gas to suppress growth of the nanoparticles. Then, the nanocrystallized nanomaterial is dispersed in graphene and bound to a surface of graphene to prepare a graphene-nanoparticle composite selected from the group consisting of graphene plus Ni, graphene plus Si, graphene plus Ti, graphene plus Cr, graphene plus Mn, graphene plus Fe, graphene plus Co, graphene plus Cu, graphene plus Ag, and graphene plus a combination of the multi-component metals, depending on the kind of the graphene-nanoparticle composite powder, that is, a nanomaterial mixed with the source.

By using such a method, it is possible to obtain the graphene-nanoparticle composite according to the present invention, in which the nanomaterial is included at a content of 30 to 60% by weight, based on the total weight of the graphene, and has a surface area accounting for 30 to 70% of the graphene-nanoparticle composite while forming crystals having an average particle size of 200 to 500 nm. In this case, a properly modified RF thermal plasma method known in the related art may be used as the method according to the present invention. In this case, the method according to the present invention may be performed using a conventional thermal plasma treatment apparatus.

Figure 7:
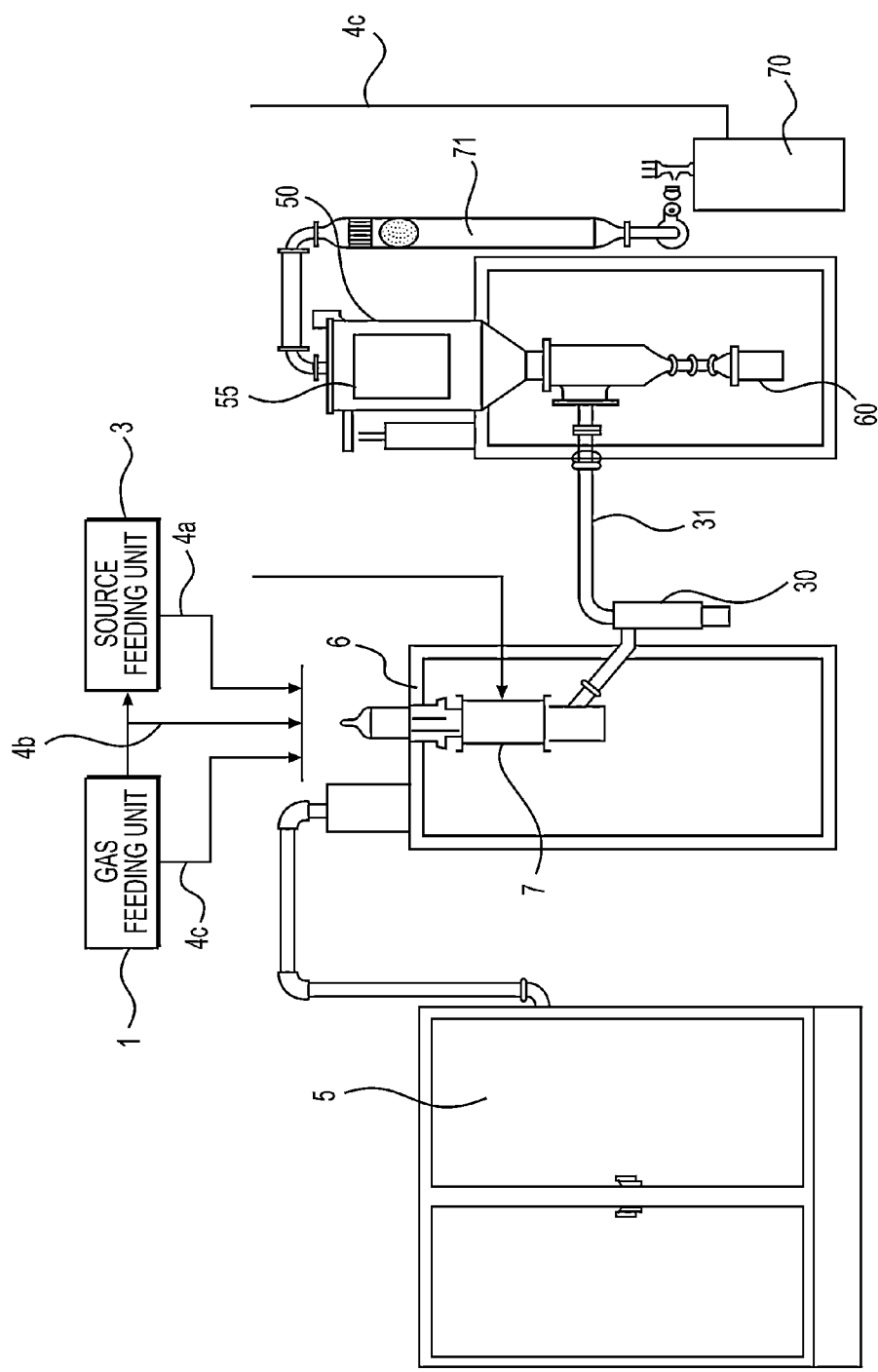
FIG. 7 is a schematic block diagram of a plasma treatment apparatus for preparing a carbon-nanoparticle composite using RF plasma according to the present invention.

FIG. 7 is a schematic block diagram showing the entire configuration of a plasma treatment apparatus for performing a method of preparing a carbon-nanoparticle composite using RF plasma according to one exemplary embodiment of the present invention. As shown in FIG. 7, one exemplary embodiment of a device for performing a method of preparing a graphene-nanoparticle composite using RF plasma according to the present invention may include a gas feeding unit 1 configured to store or feed argon gas or hydrogen gas so as to supply a central gas and a sheath gas as auxiliary gases, a source feeding unit 3 configured to feed a mixed powder and a carrier gas, a plasma power supply unit 5 configured to supply a power source for production of radio-frequency plasma, a plasma reaction and quenching unit 7 which is provided with a plasma producing electrode unit 6 configured to produce radio-frequency thermal plasma by application of a plasma power source and is configured to treat the mixed powder with plasma to nanocrystallize particles of the mixed material other than graphene and simultaneously disperse the nanocrystallized particles in graphene and bind the nanocrystallized particles onto a surface of graphene to form a graphene-nanoparticle composite, wherein a central gas supply line 4b and a sheath gas supply line 4c, and a carrier gas supply line 4a are coupled to the gas feeding unit 1 and the source feeding unit 3, respectively, and a quenching gas supply line 4d is coupled to a vacuum pump 70, a cyclone unit 30 configured to transfer the graphene-nanoparticle composite to a collector 50 through a conveyor pipe 31, a collector 50 configured to collect the graphene-nanoparticle composite through a filter 55 installed at an upper inner part thereof, a holder unit 60 detachably installed below the collector to separate and hold the graphene-nanoparticle composite, a vacuum pump 70 configured to maintain the supply of a quenching gas and a constant degree of a vacuum and circulate the gases, and a heat exchanger 71. This is one exemplary embodiment of the device, and another modified device may be used herein.

Hereinafter, one exemplary embodiment of the method according to the present invention will be briefly described with reference to the configuration of the plasma device as shown in FIG. 7.

First, a mixed powder obtained by mixing sources, a nanomaterial and graphene, is prepared using a widely used mixing machine, or using as many quantitative source supply devices as the number of sources used.

The source feeding unit 3 is a quantitative powder feeding unit configured to feed the mixed powder of graphene and nanomaterial together with an auxiliary gas to the plasma reaction and quenching unit 7. In this case, the source feeding unit 3 may be configured to feed the mixed powder smoothly by rotating at a constant rate and applying vibrations.

The gas feeding unit 1 is configured to feed various auxiliary gases such as hydrogen gas, oxygen gas and the like other than a plasma discharge gas in the plasma reaction and quenching unit 7 and argon gas supplied into the plasma torch electrode unit and the quenching unit. In this case, the auxiliary gases are fed through injection nozzles of the plasma producing electrode unit 6 and the plasma reaction and quenching unit 7 via the central gas supply line 4b, the sheath gas supply line 4c and the carrier gas supply line 4a. An inert gas such as argon gas, hydrogen, nitrogen, or a mixed gas thereof may be generally used as the gases used for the sheath gas, the central gas and the carrier gas.

The sheath gas is injected to prevent vaporized particles from being attached to an inner surface of a wall in which an induction coil of the injection nozzle of the plasma producing electrode unit 6 is installed and to protect a surface of the wall from ultra-high temperature plasma as well. In this case, 30 to 80 lpm of argon gas is injected through the injection nozzle of the plasma producing electrode unit 6 via the sheath gas supply line 4c. Also, 30 to 70 lpm of argon gas is used as the central gas, and is injected through the injection nozzle via the central gas supply line 4b, and 5 to 15 lpm of argon gas is used as the carrier gas, and is injected together with a source through the injection nozzle via the carrier gas supply line 4a.

A power source of 10 to 70 kW is applied to a plasma torch electrode of the plasma reaction unit, and a mixed powder is fed as a plate powder through the injection nozzle of the plasma producing electrode unit 6 installed above the plasma reaction unit, so that the nanomaterial included in the mixed powder can be vaporized in the radio-frequency thermal plasma.

Then, such a vaporized material is condensed or quenched by a quenching gas sprayed from the vacuum pump 70 to the plasma reaction and quenching unit 7 via the quenching gas supply line 4d, and is then nanocrystallized by suppressing growth of particles. In addition, nanopowder of the nanocrystallized nanomaterial is dispersed in graphene, and bound to a surface of graphene to cause a series of reactions for preparation of the graphene-nanoparticle composite. In this case, 0 to 80 lpm of argon gas is injected as the quenching gas through 2 to 4 graphite nozzles arranged at different positions (heights).

The nanopowder prepared through the radio-frequency thermal plasma treatment is conveyed using the vacuum pump 70 or a compressor, cooled through the cyclone unit 30 coupled to the plasma reaction and quenching unit 7, and conveyed to the collector 50 via the conveyor pipe 31. In this case, the nanopowder may be further cooled by the quenching gas supplied to the conveyor pipe 31.

The nanopowder produced in a metal filter 55, which is made of stainless steel and installed inside the collector 50, is adsorbed onto the collector 50, and various by-product gases produced in a plasma treatment process are finally exhausted through an external pipe using the vacuum pump 70. In this case, the exhausted gases may be purified, stored in a gas tank under a pressure using a booster, and re-used. When a predetermined amount of the nanopowder is adsorbed onto the filter 55 in the collector 50, the nanopowder is detached from the filter 55 using a blowback gas, and the powder of the graphene-nanoparticle composite is recovered into the nanopowder holder unit 60 provided in a lower end of the collector 50. In this case, the nanopowder may be recovered in a globe box so as to avoid a reaction with the air upon contact with the air.

Figure 6:
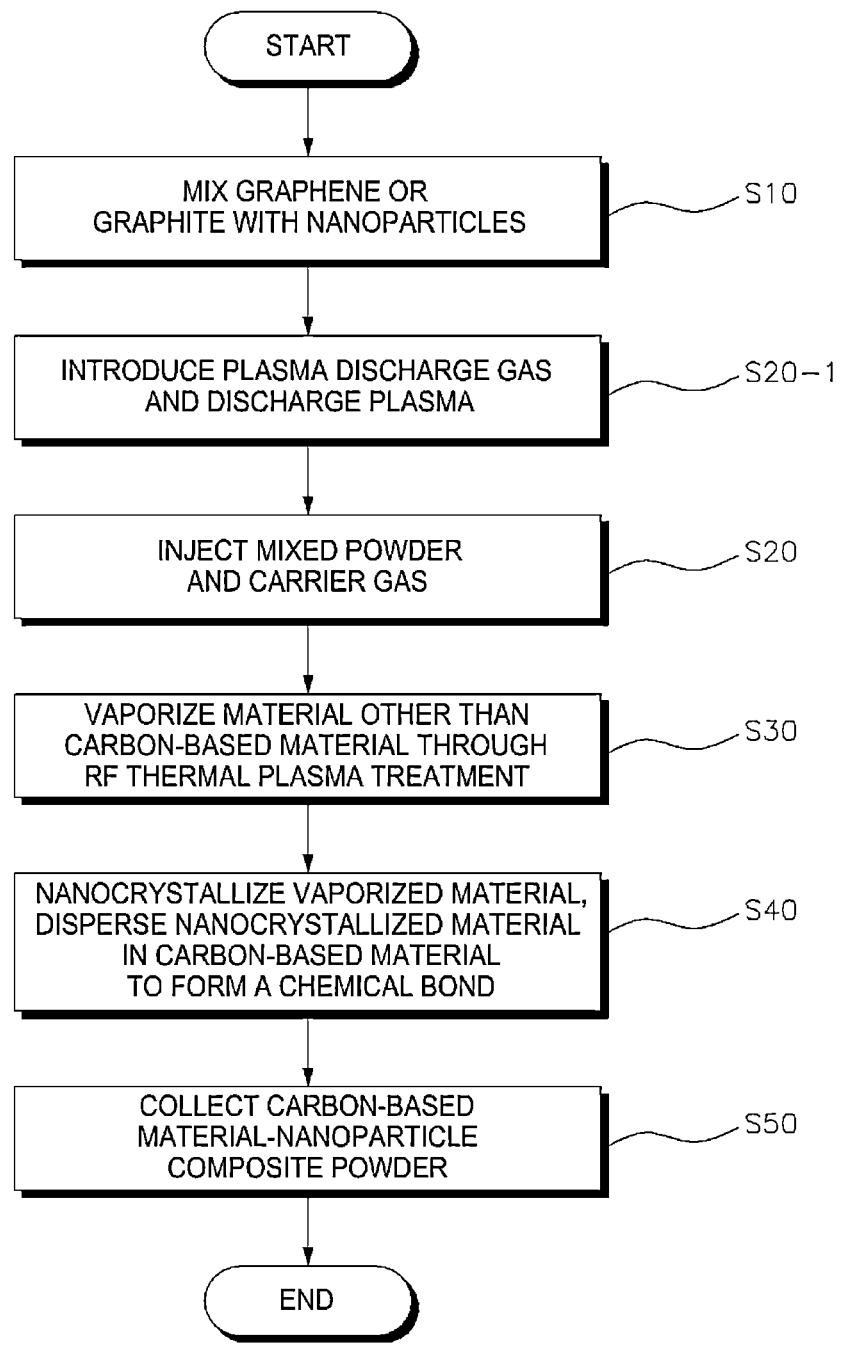
FIG. 6 is a flowchart illustrating a method of preparing a carbon-nanomaterial composite including graphene using RF plasma according to the present invention.

The method of preparing a graphene-nanoparticle composite embodied by the radio-frequency thermal plasma treatment apparatus configured thus will be described in further detail with reference to FIG. 6. FIG. 6 is a flowchart illustrating a method of preparing a carbon-nanomaterial composite including graphene using RF plasma according to the present invention.

First, the method of preparing a graphene-nanoparticle composite according to the present invention includes (a) a source mixing operation (S10) of preparing a mixed powder by mixing graphene with a nanomaterial to be synthesized using a mixing machine, or preparing for supply of sources using as many quantitative source supply devices as the number of sources, (b) a source injection operation (S20) of injecting the mixed powder into a RF plasma reaction chamber together with an auxiliary gas, (c) a plasma treatment operation (S30) of selectively vaporizing a nanomaterial other than graphene mixed with the mixed powder through radio-frequency thermal plasma treatment, (d) a plasma formation operation (S40) of nanocrystallizing the vaporized material by quenching the vaporized material with a quenching gas and forming a graphene-nanoparticle composite powder by dispersing the nanocrystallized material in graphene and binding the dispersed material to a surface of graphene, and (e) a material collection operation (S50) of collecting powder of the graphene-nanoparticle composite through a filter.

The source mixing operation (S10) is the first operation for preparing a graphene-nanoparticle composite. In this operation, a mixed powder is prepared. The mixed powder is converted into a nano-sized powder through plasma treatment in phase transformation from a solid phase to a gases phase (plasma treatment) and from a gases phase to a solid phase (quenching). As a result, the mixed powder is prepared in a solid phase. The mixed powder is obtained by mixing graphene and the nanomaterial at a proper mixing ratio in consideration of the desired characteristics of the material. Also, the mixed powder is rotated for 10 minutes to 1 hour at a rotary rate at which graphene is not damaged, that is, a rotary rate of 50 to 350 rpm, using a mixing machine, thereby preparing the mixed powder that is a source. Such a rotary rate and rotation time are optimized through several experiments in consideration of economic feasibility and supply efficiency. Also, the source supply operation is prepared using as many quantitative source supply devices as the number of sources. In addition, the radio-frequency thermal plasma treatment apparatus for bringing the present invention into practice uses a vacuum pump to maintain a constant degree of a vacuum of 10-2 to 10-1 torr at the beginning.

The source injection operation (S20) is an operation of injecting the mixed powder into the RF plasma reaction and quenching unit 7 together with an auxiliary gas. In this operation, a central gas and a sheath gas are fed to the plasma reaction unit of the plasma reaction and quenching unit 7 via the plasma producing electrode unit 6 using the gas feeding unit 1, and a quenching gas is fed to the graphite quenching unit of the plasma reaction and quenching unit 7. In this case, when a power source of 10 to 70 kW is applied to a plasma torch, plasma is produced in a plasma electrode, which results in production of high-temperature thermal plasma in the electrode.

In this case, the degree of a vacuum in the apparatus is maintained at 500 torr before injection of a source powder, and a source powder obtained by mixing graphene and a nanomaterial is then injected together with a carrier gas into plasma through the source feeding unit 3, which is a quantitative powder feeding unit, via an upper injection nozzle of the plasma producing electrode unit 6 (S20). When the power source supplied to the plasma torch is adjusted at 10 to 70 kW, a flame temperature of electromagnetic wave plasma may be used to produce suitable thermal plasma to selectively vaporize a nanomaterial included in the mixed powder. In this case, when the power source of the plasma torch is higher than this power source range, the mixed powder may be excessively vaporized due to an increase in flame temperature of plasma, thereby causing degradation of performance of preparing a composite. Also, damage may be caused to graphene to degrade the composite preparation performance. On the other hand, when the power source of the plasma torch is lower than this power source range, plasma is not produced, and electrons which are heat transfer media receives low energy form the field even when the plasma is produced. Therefore, unstable discharge may be lasted since it is difficult to maintain continuous discharge through inelastic collision, and energy to be applied to source particles may be lowered due to low inelastic collision frequencies. As a result, productivity of the nanoparticles may be deteriorated since the nanomaterial source is not completely vaporized.

Also, the kind and flow rate of the auxiliary gas injected through the injection nozzle of the plasma producing electrode unit 6 are factors having the greatest influence on the particle size of the nanopowder finally produced in this process. In the present invention, 30 to 70 lpm of argon gas is injected as the central gas, and 30 to 80 lpm of argon gas is injected as the sheath gas. In particular, the nanopowder is highly reactive with a gas since the nanopowder has a very high surface area. Therefore, an inert gas such as argon gas may be used. In addition to the inert gas, helium gas, nitrogen gas, or a mixture thereof may be used herein.

Meanwhile, 5 to 15 lpm of argon gas may be injected as the carrier gas, and thus serves to convey the mixed powder into the plasma from the source feeding unit 3. When the flow rate of the carrier gas is lower than this flow rate range, the carrier gas may not be effectively conveyed into the plasma, whereas the carrier gas may be excessively fed when the flow rate of the carrier gas is higher than this flow rate range.

When the source powder is injected as described above, the nanomaterial other than graphene is selectively vaporized through radio-frequency thermal plasma treatment in the plasma reaction and quenching unit 7 (S30), and such vaporized nanopowder is nanocrystallized while being cooled by a quenching gas sprayed through a graphite nozzle. At the same time, the nanocrystallized material is dispersed, and bound to a surface of graphene to form a graphene-nanoparticle composite, that is, a graphene-nanoparticle complex compound selected from the group consisting of graphene plus Ni, graphene plus Si, graphene plus Ti, graphene plus Cr, graphene plus Mn, graphene plus Fe, graphene plus Co, graphene plus Cu, or graphene plus a combination of the multi-component metals (S40). In this case, 0 to 80 lpm of argon gas is injected as the quenching gas through 2 to 4 nozzles having different heights. The flow rate of the quenching gas should be a flow rate experimentally determined to correspond to a flow rate of a gas to be supplied, and a supply amount of the source in consideration of desired size control of the nanoparticles, and composite formation efficiency.

Finally, in the case of the powder of the graphene-nanoparticle composite, the relatively large powder is separated in the cyclone unit 30, fed with the carrier gas to the collector 50 via the conveyor pipe 31, adsorbed onto the collecting filter 55 in the collector 50. Then, the graphene-nanoparticle composite adsorbed on the filter is detached using a blowback gas, and dropped into the holder unit 60. Subsequently, the holder unit 60 is detached to finally recover the powder (S50). In this case, the cyclone unit 30 may be optimally designed through computer simulation to be used.

In particular, the present invention is characteristic in that the surface area of the graphene surface is not enlarged, but the crystal size of the nanoparticles bound to a surface of graphene is increased unlike the conventional methods. This indicates that this dry process using thermal plasma differentiates from a conventional wet process having a limitation on the size control of the particles.

Accordingly, it is possible to prepare a graphene-nanoparticle composite having a shape required by various applications by controlling a mixing ratio of the nanomaterial according to the present invention. For example, when the graphene-nanoparticle composite is applied to an Ag paste, a graphene-Ag composite has an advantage in that an amount of silver used may be remarkably reduced when graphene having a low bulk density, that is, a high volume, is mixed with Ag. Also, graphene can be used as a substitute material for reducing an amount of expensive silver used.

Hereinafter, preparation of a graphene-nanoparticle composite using radio-frequency thermal plasma according to the present invention will be described in further detail.

EXAMPLES

Hereinafter, example embodiments of the present invention will be described in further detail with reference to the accompanying drawings. It will be understood, however, that the description proposed herein is merely example embodiments for the purpose of illustrations only, not intended to limit the scope of the invention, as apparent to those skilled in the art to which the present invention belongs.

Example 1: Preparation and Characterization of Graphene-Tin (Sn) Nanoparticle Composite 1-1

Preparation of graphene-Sn nanoparticle composite.

Graphene and tin (Sn) powder were mixed for 10 minutes at a mixing ratio of 1:2 to prepare a source powder, and 30 lpm and 50 lpm of argon gas were injected as the central gas and the sheath gas into a radio-frequency thermal plasma device for performing a preparation process according to the present invention. Then, this experiment was performed without injecting a quenching gas.

Subsequently, a voltage of 17 kW was applied to a power source of a plasma torch to produce high-temperature thermal plasma, and a degree of a vacuum in the device was maintained at 500 torr before injection of a source powder. Then, the source powder mixed with graphene was injected into a radio-frequency thermal plasma reaction unit through an injection nozzle of the plasma producing electrode unit 6, and the graphene in the radio-frequency thermal plasma reaction unit was passed without any thermal damage by graphene, and only tin (Sn) powder was subjected to a selective vaporization process to be crystallized into nanopowder, which was then allowed to bind to graphene.

One unique advantage of such a reaction process is that nickel is not vaporized through heat transfer caused by collision between a solid (tin) and electrons due to heat radiating characteristics of graphene upon use of graphene, but is pulverized into nanoparticles at a low power due to heat transfer characteristics between a solid (graphene) and a solid (nanomaterial), both of which easily emit high-temperature heat of plasma.

The conventional micrometer-sized nickel powder was pulverized into nanoparticles at a high power of 60 kW or more. In this experiment, however, the nickel powder was pulverized into nanoparticles at a much lower power of 17 kW to form a composite. Also, since a quenching effect was good due to the high heat radiating characteristics without injecting a quenching gas, it is possible to form a graphene-nano-tin composite using an economical process capable of cutting down the operating cost.

The powder of the nanoparticle composite in which graphene was bound to tin was separated from the cyclone unit 30, passed through the conveyor pipe 31, and adsorbed onto the filter 55 of the collector 50. Then, the powder adsorbed onto the filter was collected in the holder unit 60 while undergoing a blowback process.

From the EDX analysis results, it was revealed that the Sn content on the graphene-Sn nanoparticle composite was 43.5% by weight (FIG. 1).

1-2. FE-SEM Imaging.

As shown in FIG. 1, it was confirmed that the average particle diameter of the crystallized tin nanoparticles was generally greater than or equal to 200 nm, and crystals having an average particle diameter of 300 nm or more were present in a large amount.

As described above, it could be seen that the graphene-Sn nanoparticle composite according to the present invention had a Sn content of 40% by weight or more, and the crystallized tin nanoparticles had an average particle diameter of 200 nm or more.

Example 2: Preparation and Characterization of Graphene-Silver (Ag) Nanoparticle Composite 2-1

Preparation of graphene-Ag nanoparticle composite.

Graphene and silver (Ag) powder were mixed at a mixing ratio of 4:1, 2:1, 1:1, and 1:1.5, and stirred for 10 minutes in a mixing machine to prepare a source powder. Then, a graphene-Ag nanoparticle composite was prepared in the same manner as in Example 1-1.

2-2. FE-SEM Imaging.

FIG. 4 shows FE-SEM imaging results (the same magnification of 50,000×) of the nanoparticle composite prepared according to a change in mixing ratio between graphene and Ag in the graphene-Ag nanoparticle composite prepared in Example 2-1. From the imaging results as shown in FIG. 4, it could be seen that the size of the silver nanopowder increased with an increase in mixing ratio of the powder. In particular, it was confirmed that silver did not increase a surface are of graphene, but increased the size of the particles bound to a surface graphene, unlike the other metallic materials.

From these facts, it was proven that the graphene nanoparticle composite according to the present invention prepared by the dry process using thermal plasma differentiated from the conventional wet process having limitation on the size control of the particles.

In the case of the graphene-nanoparticle (for example, Ag) composite, when the corresponding nanomaterial, silver (Ag) powder, is mixed with graphene having a low bulk density, that is, a high volume, it can also be predicted that an amount of silver used can be reduced remarkably, and graphene can be used as a substitute material for reducing an amount of expensive silver used.

From the EDX analysis results, it was revealed that the Ag contents on the graphene-Ag nanoparticle composite were 44.6% by weight and 62.6% by weight, respectively, when graphene and Ag were mixed at mixing ratios of 1:1 and 1:1.5 (FIG. 5). That is, it could be seen that the nanoparticles were included at a very high content of 30 to 60% by weight, based on the total weight of the composite according to the present invention.

Experimental Example 1: Confirmation of Chemical Bonds

Figure 3:
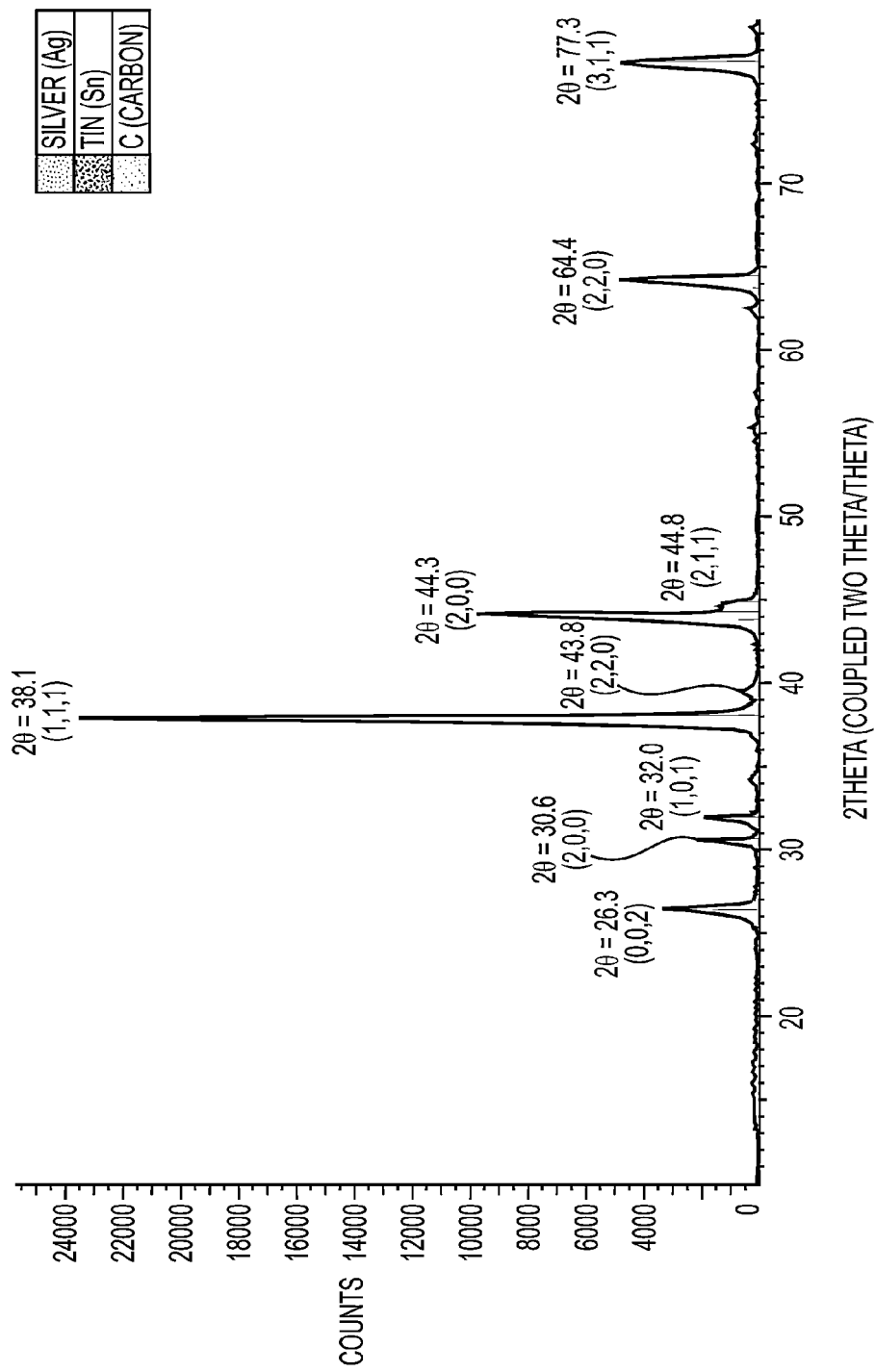
FIG. 3 is a graph illustrating XRD analysis results of a prepared graphene-Ag nanoparticle composite.

A graph showing the XRD analysis results capable of determining whether there are chemical bonds is shown in FIG. 3. For example, from the XRD analysis results on the composite of graphene and Sn, it was revealed that the peaks of Sn and C were observed, but the peak of Sn—C was not observed. This is because Sn preferentially binds to an O atom. Since a bond between Sn and O is preferentially formed in the synthetic product of graphene and Sn through the chemical bonds, the Sn—C peak was not observed from XRD.

As described above, the present invention relates to a graphene-nanoparticle composite having a structure in which nanoparticles are crystallized at a high density in a surface of graphene to form chemical bonds. Therefore, the graphene-nanoparticle composite exhibits excellent mechanical and electric characteristics since the nanoparticles are included at a large amount of 30% by weight or more, and have a high diameter of 200 nm or more. Accordingly, the graphene-nanoparticle composite can be very effectively used in various electrochemical devices.

Although the present invention has been described in detail with reference to the accompanying drawings, as described above, it will be apparent to those skilled in the art that various modifications can be made to the above-described exemplary embodiments of the present invention without departing from the scope of the invention. Thus, it is intended that the present invention covers all such modifications provided they come within the scope of the appended claims and their equivalents.

The terms "approximately" and "about" are interchangeably used herein and indicate an amount, level, value, number, frequency, percent, dimension, size, quantity, weight or length changed by 30, 25, 20, 15, 10, 9, 8, 7, 6, 5, 4, 3, 2 or 1% from a reference amount, level, value, number, frequency, percent, dimension, size, quantity, weight or length.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

The present invention has been described in detail with reference to preferred embodiments thereof. However, it will be appreciated by those skilled in the art that changes may be made in these embodiments without departing from the principles of the invention, the scope of which is defined in the appended claims and equivalents thereof.

What is claimed is:

1. A graphene-nanoparticle composite comprising:
a planar layer of graphene; and
nanoparticles crystallized on a surface of the planar layer of graphene and directly chemically bonded to the surface, wherein the nanoparticles are at least one material selected from the group consisting of Ag, Ni, Si, Ti, Cr, Mn, Fe, Co, Cu, Sn, In, Pt, Au, Mg, and a combination thereof at a content of 30 to 60% by weight based on the total weight of the composite, wherein the crystallized nanoparticles have an average particle diameter greater than 200 and less than or equal to 500 nm.

2. The graphene-nanoparticle composite of claim 1, wherein the nanoparticles have a surface area accounting for 30 to 70% of the graphene-nanoparticle composite.

3. The graphene-nanoparticle composite of claim 1, wherein the graphene-nanoparticle composite has an electric conductivity of 1,000 to 3,000 S/m.

4. The graphene-nanoparticle composite of claim 1, wherein the graphene-nanoparticle composite has a thermal conductivity of 5 to 30 W/mK.

5. The graphene-nanoparticle composite of claim 1, wherein the nanoparticles are particles of Ag or Sn.

6. The graphene-nanoparticle composite of claim 1, wherein the graphene and the nanoparticles are present at a weight ratio (% by weight) of 1:1 to 1:3.

7. The graphene-nanoparticle composite of claim 1, further comprising one or more additional graphene-nanoparticle composites, wherein each of the one or more additional graphene-nanoparticle composites comprise:

a planar layer of graphene; and nanoparticles crystallized on a surface of the planar layer of graphene and chemically bonded to the surface, wherein the nanoparticles are at least one material selected from the group consisting of Ag, Ni, Si, Ti, Cr, Mn, Fe, Co, Cu, Sn, In, Pt, Au, Mg, and a combination thereof at a content of 30 to 60% by weight based on the total weight of the composite, wherein the crystallized nanoparticles have an average particle diameter greater than 200 and less than or equal to 500 nm, and wherein the graphene-nanoparticle composite and the one or more additional graphene-nanoparticle composites are stacked to form a stacked structure.

8. The graphene-nanoparticle composite of claim 7, wherein the stacked structure is part of an electrochemical device.

9. The graphene-nanoparticle composite of claim 8, wherein the part of an electrochemical device is an electrode, an electric element, or a thermoelectric material.

* * * * *